United States Patent
Chen et al.

(10) Patent No.: US 10,344,401 B2
(45) Date of Patent: Jul. 9, 2019

(54) METHOD FOR MANUFACTURING NYLON 66 HOLLOW FIBER

(71) Applicant: CHAIN YARN CO., LTD., Taichung (TW)

(72) Inventors: Yen-Hsiao Chen, Yunlin County (TW); Chung-Chen Wu, Yunlin County (TW); Chi-Lu Huang, Yunlin County (TW); Chuan-Shing Lin, Yunlin County (TW)

(73) Assignee: CHAIN YARN CO., LTD., Taichung (TW)

( * ) Notice: Subject to any disclaimer, the term of this patent is extended or adjusted under 35 U.S.C. 154(b) by 628 days.

(21) Appl. No.: 14/992,012

(22) Filed: Jan. 10, 2016

(65) Prior Publication Data

US 2017/0037542 A1 Feb. 9, 2017

(30) Foreign Application Priority Data

Aug. 3, 2015 (TW) .............................. 104125119 A

(51) Int. Cl.
*D01D 1/04* (2006.01)
*D01D 1/10* (2006.01)
(Continued)

(52) U.S. Cl.
CPC .............. *D01D 5/24* (2013.01); *D01D 5/088* (2013.01); *D01F 6/60* (2013.01); *D02J 1/228* (2013.01);
(Continued)

(58) Field of Classification Search
CPC .......... B29B 2013/225; B29C 47/0014; B29C 47/882; B29C 47/901; D01D 1/04;
(Continued)

(56) References Cited

U.S. PATENT DOCUMENTS 5,155,178 A * 10/1992 Windley ................ C08G 69/00
428/97
6,120,718 A * 9/2000 Kotek ...................... D01D 5/24
264/209.1 X (Continued)

FOREIGN PATENT DOCUMENTS

| CN | 101768789 A | 7/2010 |
|---|---|---|
| CN | 104451917 A | 3/2015 |

(Continued)

*Primary Examiner* — Leo B Tentoni
(74) *Attorney, Agent, or Firm* — CKC & Partners Co., LLC

(57) ABSTRACT

A method for manufacturing a nylon 66 hollow fiber includes steps as follows. A plurality of nylon 66 particles are provided. A melting step is provided, wherein the nylon 66 particles are melted so as to form a spun liquid. A fiber spitting step is provided, wherein the spun liquid goes through a hollow spinneret plate so as to form hollow nascent fibers. An evacuating step is provided, wherein the hollow nascent fibers are preliminarily solidified so as to form hollow half-solidified fibers. A cooling step is provided, wherein the hollow half-solidified fibers are cooled and solidified so as to form solidified fibers. A collecting and oiling step is provided. A drawing step is provided. A winding step is provided so as to obtain the nylon 66 hollow fiber.

4 Claims, 6 Drawing Sheets

(51) Int. Cl.
  *D01D 5/092* (2006.01)
  *D01D 5/096* (2006.01)
  *D01D 7/00* (2006.01)
  *D02J 1/22* (2006.01)
  *D01D 5/24* (2006.01)
  *D01D 5/088* (2006.01)
  *D01F 6/60* (2006.01)
  *D03D 15/00* (2006.01)
  *B29L 23/00* (2006.01)
  *B29L 31/00* (2006.01)
  *B29K 105/00* (2006.01)
  *B29K 77/00* (2006.01)
  *B29B 13/00* (2006.01)

(52) U.S. Cl.
  CPC ........ *D03D 15/00* (2013.01); *B29B 2013/005* (2013.01); *B29K 2077/00* (2013.01); *B29K 2105/0067* (2013.01); *B29K 2105/258* (2013.01); *B29L 2023/00* (2013.01); *B29L 2031/731* (2013.01); *D10B 2331/02* (2013.01)

(58) Field of Classification Search
  CPC .......... D01D 1/10; D01D 1/103; D01D 5/092; D01D 5/096; D01D 5/24; D01D 7/00; D01F 6/60; D02J 1/22; D02J 1/228
  USPC ...... 264/101, 102, 129, 209.1, 209.2, 209.3, 264/209.4, 209.5, 209.6, 209.7, 210.6, 264/210.7, 210.8, 211.12, 211.14, 211.15
  See application file for complete search history.

(56) References Cited

U.S. PATENT DOCUMENTS

| | | | | |
|---|---|---|---|---|
| 2002/0123576 A1* | 9/2002 | Studholme | ................ | D01F 1/04 525/419 |
| 2003/0080463 A1* | 5/2003 | Harris | ...................... | D01F 6/60 264/210.8 X |
| 2005/0203258 A1* | 9/2005 | Kimura | ................... | D01F 6/625 525/450 |

FOREIGN PATENT DOCUMENTS

| | | |
|---|---|---|
| CN | 104562250 A | 4/2015 |
| CN | 104812949 A | 7/2015 |
| JP | 47-50007 | 12/1972 |
| JP | 48-53013 | 7/1973 |
| JP | 57-061710 | 4/1982 |
| JP | 2002038328 A | 2/2002 |
| JP | 2003-020518 A | 1/2003 |
| JP | 2003193325 A | 7/2003 |
| JP | 2008-088583 A | 4/2008 |
| JP | 2010106393 A | 5/2010 |
| TW | 294731 B | 1/1997 |
| TW | M264282 U | 5/2005 |
| TW | 201137196 A | 11/2011 |
| TW | 201425668 A | 7/2014 |

\* cited by examiner

METHOD FOR MANUFACTURING NYLON 66 HOLLOW FIBER

RELATED APPLICATIONS

This application claims priority to Taiwan Application Serial Number 104125119, filed Aug. 3, 2015, which is herein incorporated by reference.

BACKGROUND

Technical Field

The present disclosure relates to a nylon 66 fiber, and a method and an equipment for manufacturing the same. More particularly, the present disclosure relates to a nylon 66 hollow fiber, and a method and an equipment for manufacturing the same.

Description of Related Art

A polyamide (PA) refers to a polymer formed from monomers having a carboxyl group and monomers having an amino group polymerized via an amide bond. The manufacturing process of the polyamide is simple, and the polyamide has excellent durability and strength. Thus, the polyamide is widely applied to a variety of fields: such as textiles, auto parts, electronics and food package. A polyamide 66 (also known as nylon 66) is a kind of polyamide, which is the product of the condensing polymerization of adipic acid and hexamethylenediamine. The polyamide 66 can be made into fibers easily, and the textiles made of the fibers are featured with excellent quality. As a result, the polyamide 66 has become the mainstream material in the field of textiles.

In recent years, with the popularity of outdoor activities, such as road running, cycling, hiking and camping, the demand of functional fabrics has been increasing. According to the application, the functional fabrics can have at least one of the functions of moisture management, lightweight, cool feeling, thermal insulation, sun blocking and high abrasion resistance. However, the conventional fibers with circular cross section cannot satisfy the high quality requirement of the functional fabrics. A variety of fibers with different cross section are provided, such as 1-shaped, triangular, cross shaped, Y-shaped and hollow cross section. Among the foregoing fibers, the fiber with hollow cross section can save the usage amount of raw material, and has advantages of light weight and thermal insulation, so that the fiber with hollow cross section has drawn a considerable attention.

Currently, the method for manufacturing a nylon 66 hollow fiber is similar to that of a nylon 66 fiber with circular cross section. Specifically, a circular spinneret plate used in the method for manufacturing the nylon 66 with circular cross section is replaced by a hollow spinneret plate. When a spun liquid of nylon 66 goes through the circular spinneret plate, the nylon 66 fiber with circular cross section can be obtained. Similarly, when the spun liquid of nylon 66 goes through the hollow spinneret plate, the nylon 66 fiber with hollow cross section (i.e., the nylon 66 hollow fiber) can be obtained. In detail, the spun liquid of nylon 66 goes through the hollow spinneret plate, then have to go through a slow cooling region (the cooling is conducted under no wind condition) and a cooling wind region so as to from the nylon 66 hollow fiber. However, when the spun liquid of nylon 66 goes through the hollow spinneret plate, a swell phenomenon occurs. When the swell phenomenon is excessive, the inner diameter of the nylon 66 hollow fiber will be excessively small, and the hollow ratio of the nylon 66 hollow fiber cannot be maintained. For solving the problem, a solution of accelerating the cooling is provided. For example, the distance of the slow cooling region is shortened, or the time for the nylon 66 hollow fiber to go through the slow cooling region is shortened. Accordingly, the excessive swell phenomenon can be avoided, and the hollow ratio of the nylon 66 hollow fiber can be maintained. However, the strength of the nylon 66 hollow fiber is reduced when the cooling is accelerated. Therefore, how to enhance the hollow ratio of the nylon 66 hollow fiber while maintaining the strength thereof is the goal of the related industries.

SUMMARY

According to one aspect of the present disclosure, a method for manufacturing a nylon 66 hollow fiber includes steps as follows. A plurality of nylon 66 particles are provided. A melting step is provided, wherein the nylon 66 particles are melted so as to form a spun liquid. A fiber spitting step is provided, wherein the spun liquid goes through a hollow spinneret plate so as to form a plurality of hollow nascent fibers. An evacuating step is provided, wherein a thermal energy of the hollow nascent fibers is taken away by evacuating, and the hollow nascent fibers are preliminarily solidified so as to form a plurality of hollow half-solidified fibers. A cooling step is provided, wherein a cooling wind with a temperature ranging from 16° C. to 22° C. is provided for cooling and solidifying the hollow half-solidified fibers so as to form a plurality of solidified fibers. A collecting and oiling step is provided, wherein the solidified fibers are collected and oiled so as to form a bundled fiber. A drawing step is provided, wherein the bundled fiber is drawn so as to form a stretched fiber. A winding step is provided, wherein the stretched fiber is wound around a cylindrical element so as to obtain the nylon 66 hollow fiber.

According to another aspect of the present disclosure, a nylon 66 hollow fiber is provided. The nylon 66 hollow fiber is made by the method according to the aforementioned aspect. A hollow ratio of the nylon 66 hollow fiber is 8% to 12%.

According to yet another aspect of the present disclosure, an equipment for manufacturing a nylon 66 hollow fiber is provided. The equipment sequentially includes an extruder, a manifold, a spinning beam, an evacuating room, a cooling room, a collecting and oiling device, a drawing device and a winding device. The nylon 66 particles are melted in the extruder so as to form a spun liquid. The manifold is communicated with the extruder. The spun liquid flows from the extruder into the manifold. One end of the spinning beam is communicated with the manifold, and the other end of the spinning beam has a hollow spinneret plate. The spun liquid flows from the manifold into the spinning beam, and the spun liquid goes through the hollow spinneret plate so as to form a plurality of hollow nascent fibers. The evacuating room is connected with the end of the spinning beam having the hollow spinneret plate. The evacuating room is further connected with an evacuating device, a thermal energy of the hollow nascent fibers is taken away by the evacuating device, and the hollow nascent fibers are preliminarily solidified so as to form a plurality of hollow half-solidified fibers. The cooling room is connected with the evacuating room via one end thereof. The cooling room is further connected with a cooling device, and a cooling wind with a temperature ranging from 16° C. to 22° C. is provided by the cooling device for cooling and solidifying the hollow half-solidified fibers so as to form a plurality of solidified fibers. The collecting and oiling device is disposed at the other end of the cooling room, wherein the solidified fibers are collected and oiled by the collecting and oiling device so as to form a bundled fiber. The drawing device is adjacent to the collecting and oiling device. The bundled fiber is drawn by the drawing device so as to form a stretched fiber. The winding device is adjacent to the drawing device. The winding device includes a cylindrical element, and the stretched fiber is wound around the cylindrical element so as to obtain the nylon 66 hollow fiber.

BRIEF DESCRIPTION OF THE DRAWINGS

The disclosure can be more fully understood by reading the following detailed description of the embodiment, with reference made to the accompanying drawings as follows.

DETAILED DESCRIPTION

Method For Manufacturing A Nylon 66 Hollow Fiber

Figure 1:
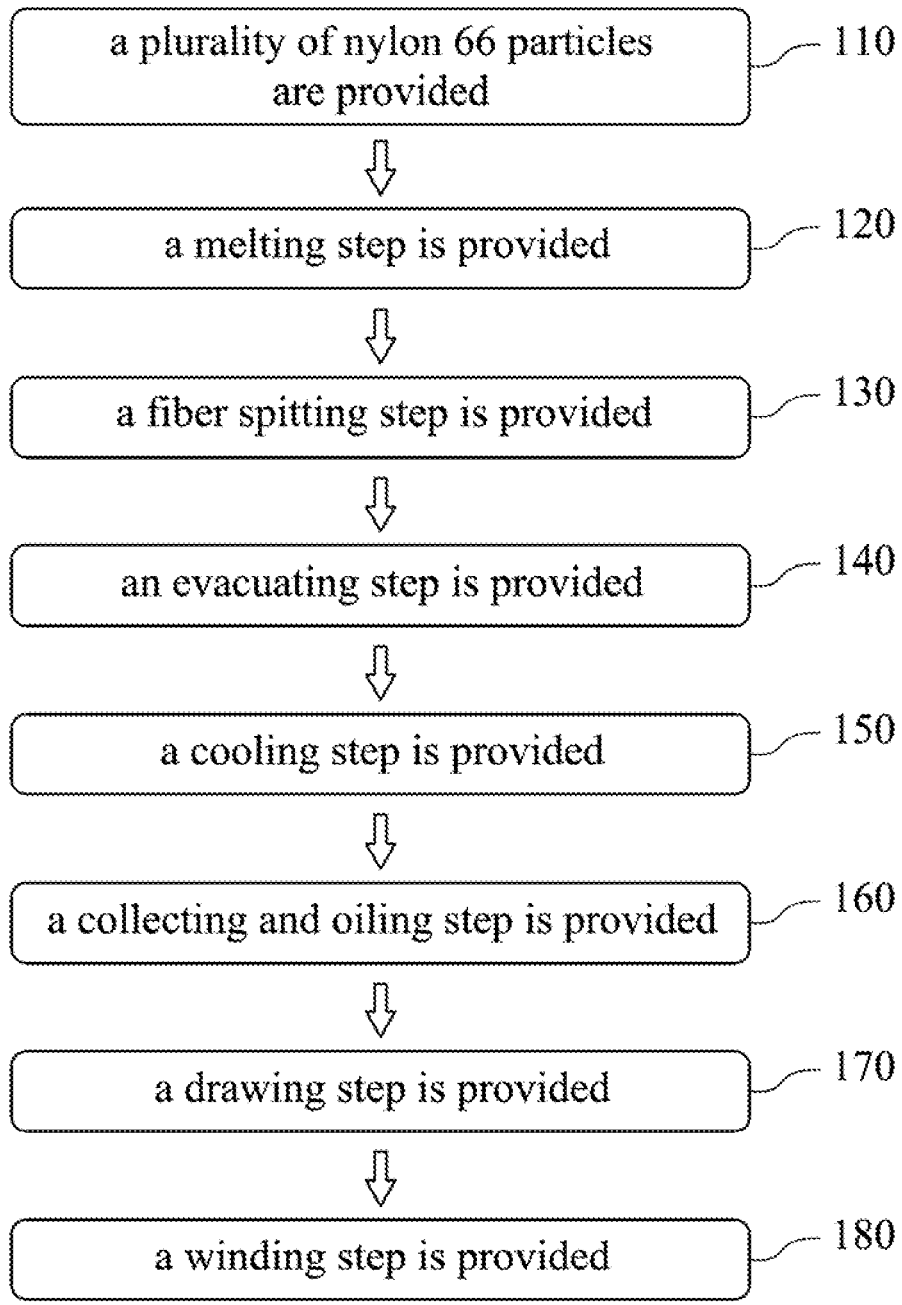
FIG. 1 is a flow diagram showing a method for manufacturing a nylon 66 hollow fiber according to one embodiment of the present disclosure.

FIG. 1 is a flow diagram showing a method for manufacturing a nylon 66 hollow fiber according to one embodiment of the present disclosure. In FIG. 1, the method for manufacturing the nylon 66 hollow fiber includes Step 110, Step 120, Step 130, Step 140, Step 150, Step 160, Step 170 and Step 180.

In Step 110, a plurality of nylon 66 particles are provided. A weight-average molecular weight of the nylon 66 particles can be 30000 to 50000. A polydispersity index (PDI) of the nylon 66 particles can be 1.5 to 2.5. A relative viscosity in sulfuric acid of the nylon 66 particles can be in a range of 3.2 to 3.4. When the relative viscosity in sulfuric acid of the nylon 66 particles is smaller than 3.2, the strength of the nylon 66 hollow fiber may be excessively low. When the relative viscosity in sulfuric acid of the nylon 66 particles is greater than 3.4, the residence time of a spun liquid of nylon 66 in the manifold may be excessively long, and is unfavorable for spinning. A moisture content of the nylon 66 particles can be in a range of 500 ppm to 2000 ppm. Therefore, the moisture content of the nylon 66 particles is proper, better spinning properties can be obtained, and the probability of fiber break and degradation of the nylon 66 particles can be reduced.

In Step 120, a melting step is provided, wherein the nylon 66 particles are melted so as to form the spun liquid. The melting step can be conducted in an extruder at a temperature ranging from 290° C. to 295° C. When the temperature is lower than 290° C., the current of the extruder increases, which is unfavorable for melting the nylon 66 particles. When the temperature is higher than 295° C., the nylon 66 particles tend to decomposed and cannot be spun.

In Step 130, a fiber spitting step is provided, wherein the spun liquid goes through a hollow spinneret plate so as to form a plurality of hollow nascent fibers.

In Step 140, an evacuating step is provided, wherein a thermal energy of the hollow nascent fibers is taken away by evacuating, and the hollow nascent fibers are preliminarily solidified so as to form a plurality of hollow half-solidified fibers. Therefore, an excessive swell of the hollow nascent fibers can be prevented. Accordingly, an excessively small inner diameter of the nylon 66 hollow fiber can be avoided. Furthermore, a rapid cooling of the hollow nascent fibers which may reduce a strength of the nylon 66 hollow fiber can be avoided.

In Step 150, a cooling step is provided, wherein a cooling wind with a temperature ranging from 16° C. to 22° C. is provided for cooling and solidifying the hollow half-solidified fibers so as to form a plurality of solidified fibers. Therefore, the temperature of the cooling wind is proper. When the temperature is less than 16° C., the cooling is too fast, and the uniaxial alignment of the molecules is affected. When the temperature is greater than 22° C., the cooling is insufficient, which is unfavorable for the drawing step that follows. The wind speed of the cooling wind can be in the range of 0.55 m/s to 0.75 m/s.

In Step 160, a collecting and oiling step is provided, wherein the solidified fibers are collected and oiled so as to form a bundled fiber. The technique of oiling the solidified fibers is conventional, and will not be described herein.

In Step 170, a drawing step is provided, wherein the bundled fiber is drawn so as to form a stretched fiber.

Figure 2:
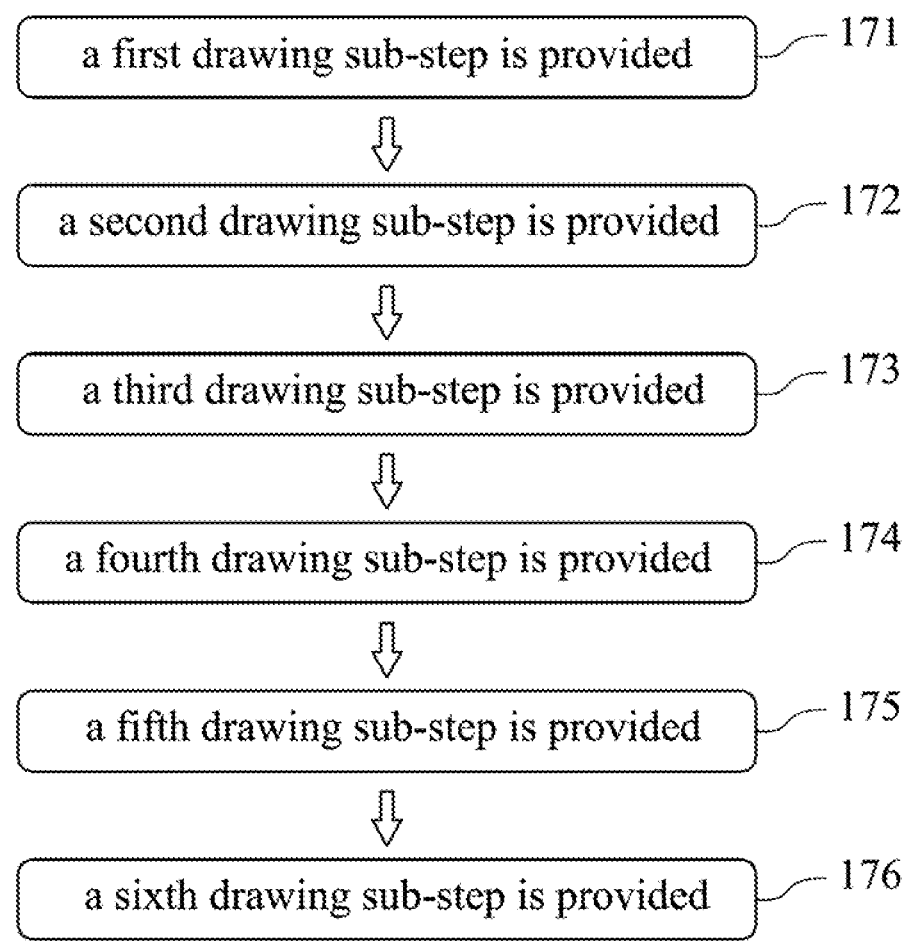
FIG. 2 is a flow diagram showing Step 170 in FIG. 1.

FIG. 2 is a flow diagram showing Step 170 in FIG. 1. In FIG. 2, Step 170 includes Step 171, Step 172, Step 173, Step 174, Step 175 and Step 176.

In Step 171, a first drawing sub-step is provided, wherein the bundled fiber is drawn with a rotational speed of 580 m/min to 780 m/min at room temperature. In Step 172, a second drawing sub-step is provided, wherein the bundled fiber is drawn with a rotational speed of 615 m/min to 815 m/min at a temperature ranging from 55° C. to 65° C. In Step 173, a third drawing sub-step is provided, wherein the bundled fiber is drawn with a rotational speed of 1700 m/min to 2300 m/min at a temperature ranging from 130° C. to 150° C. In Step 174, a fourth drawing sub-step is provided, wherein the bundled fiber is drawn with a rotational speed of 2600 m/min to 3200 m/min at a temperature ranging from 200° C. to 220° C. In Step 175, a fifth drawing sub-step is provided, wherein the bundled fiber is drawn with a rotational speed of 2950 m/min to 3350 m/min at a temperature ranging from 210° C. to 230° C. In Step 176, a sixth drawing sub-step is provided, wherein the bundled fiber is drawn with a rotational speed of 2780 m/min to 3180 m/min at a temperature ranging from 170° C. to 190° C. The strength of the final product, i.e., the nylon 66 hollow fiber, can be improved by the multistage draw of Step 171 to Step 176. Moreover, the bundled fiber can be heat set by Step 170. Accordingly, the internal stress of the bundled fiber can be reduced, and the hollow ratio of the final product, i.e., the nylon 66 hollow fiber, can be maintained.

Figure 3:
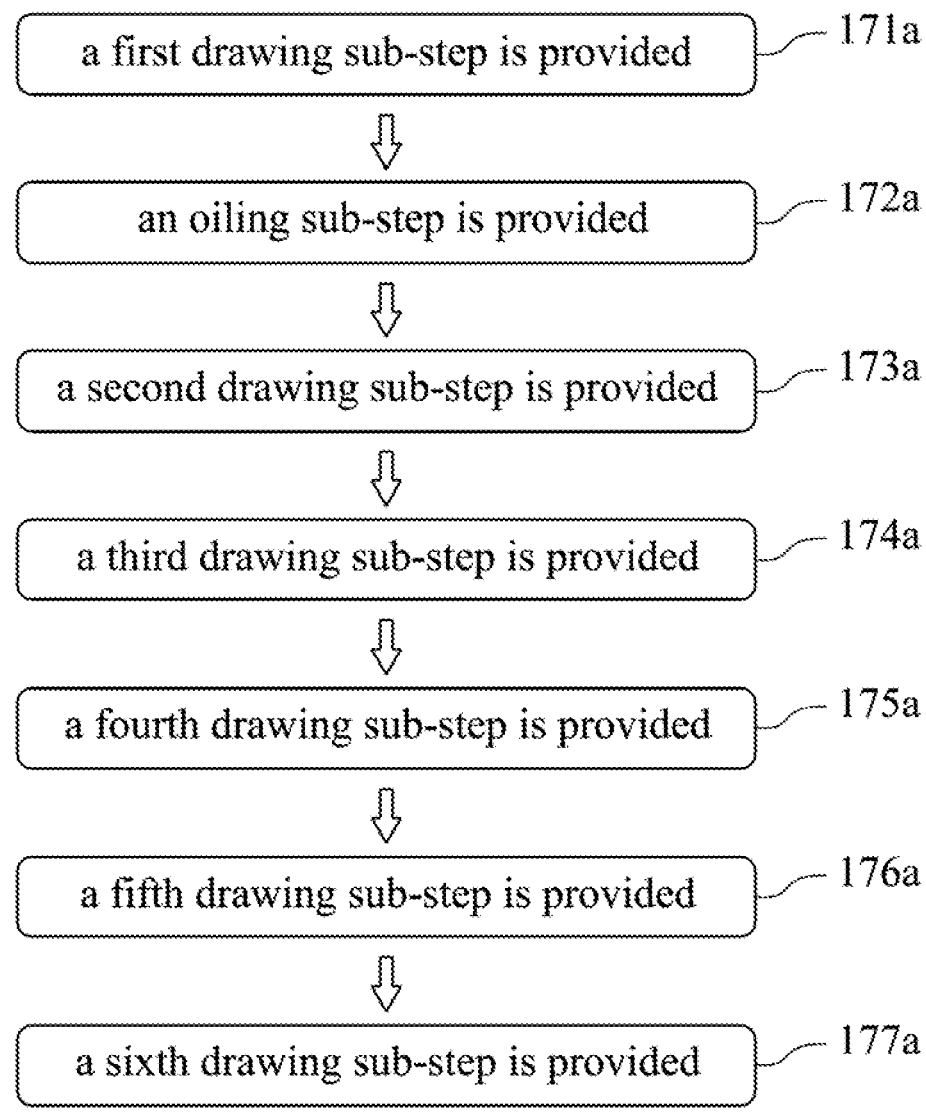
FIG. 3 is a flow diagram showing Step 170 according to another embodiment of the present disclosure.

FIG. 3 is a flow diagram showing Step 170 according to another embodiment of the present disclosure. In FIG. 3, Step 170 includes Step 171a, Step 172a, Step 173a, Step 174a, Step 175a, 176a and Step 177a. In Step 171a, a first drawing sub-step is provided. In Step 173a, a second drawing sub-step is provided. In Step 174a, a third drawing sub-step is provided. In Step 175a, a fourth drawing sub-step is provided. In Step 176a, a fifth drawing sub-step is provided. In Step 177a, a sixth drawing sub-step is provided.

The detail of the first drawing sub-step to the sixth drawing sub-step have been described above, and will not be repeated herein. Comparing to the embodiment shown in FIG. 2, Step 172a is added in the embodiment shown in FIG. 3. In Step 172a, an oiling sub-step is provided, wherein the bundled fiber is oiled by an oiling roller assembly. When the oiling sub-step is conducted between two of the drawing sub-steps (in the embodiment, the oiling sub-step is conducted between the first drawing sub-step and the second drawing sub-step, in other embodiments, the oiling sub-step can be conducted between two other drawing sub-steps), the bundled fiber can be oiled more uniformly, and the bundled fiber tends not to break in the following drawing sub-steps. Accordingly, the yield of the nylon 66 hollow fiber is increased.

Please back to FIG. 1. In Step 180, a winding step is provided, wherein the stretched fiber is wound around a cylindrical element so as to obtain the nylon 66 hollow fiber. The winding step can be conducted with a rotational speed of 2800 m/min to 3200 m/min at room temperature. Thus, a spinning cake of the nylon 66 hollow fiber can be formed, which is favorable for packing up and delivering the nylon 66 hollow fiber. Furthermore, the physical property required by the nylon 66 hollow fiber, such as strength and elongation, can be obtained by Step 170 coordinating with Step 180.

Figure 4:
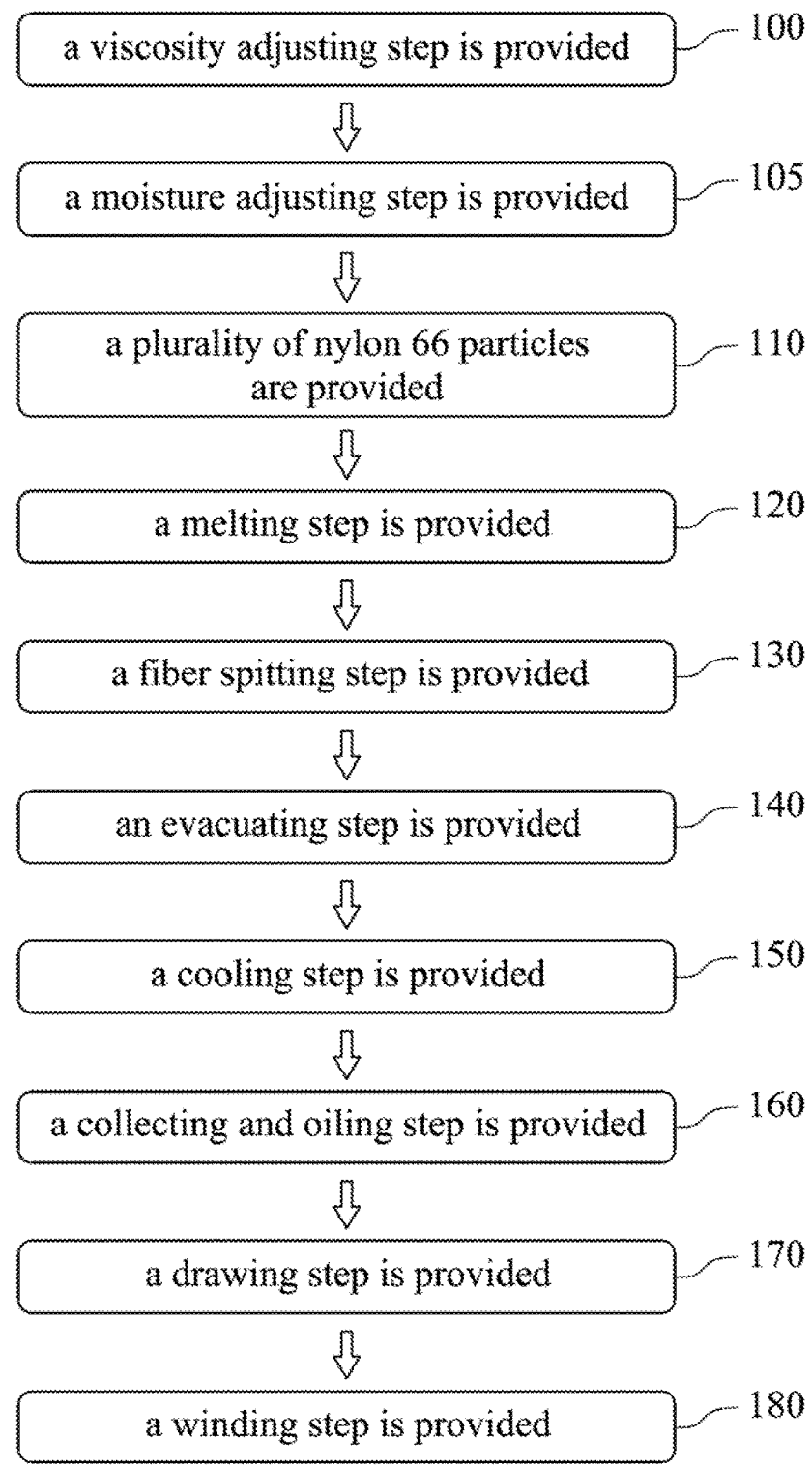
FIG. 4 is a flow diagram showing a method for manufacturing a nylon 66 hollow fiber according to yet another embodiment of the present disclosure.

FIG. 4 is a flow diagram showing a method for manufacturing a nylon 66 hollow fiber according to yet another embodiment of the present disclosure. Comparing to the method shown in FIG. 1, Step 100 and Step 105 are added in the method shown in FIG. 4.

In Step 100, a viscosity adjusting step is provided, wherein a relative viscosity in sulfuric acid of the nylon 66 particles is adjusted to a range of 3.2 to 3.4. When the relative viscosity in sulfuric acid of the nylon 66 particles, such as the commercially available nylon 66 particles, is out the forging range, Step 100 can be conducted prior to Step 110, so that the yield and physical property of the nylon 66 hollow fiber can be enhanced.

In Step 105, a moisture adjusting step is provided, wherein a moisture content of the nylon 66 particles is adjusted to a range of 500 ppm to 2000 ppm. When the moisture content of the nylon 66 particles, such as the commercially available nylon 66 particles, is out the forging range, Step 105 can be conducted prior to Step 110, so that the yield and physical property of the nylon 66 hollow fiber can be enhanced.

The detail of Step 110 to Step 180 have been described above, and will not be repeated herein.

Equipment For Manufacturing the Nylon 66 Hollow Fiber

Figure 5:
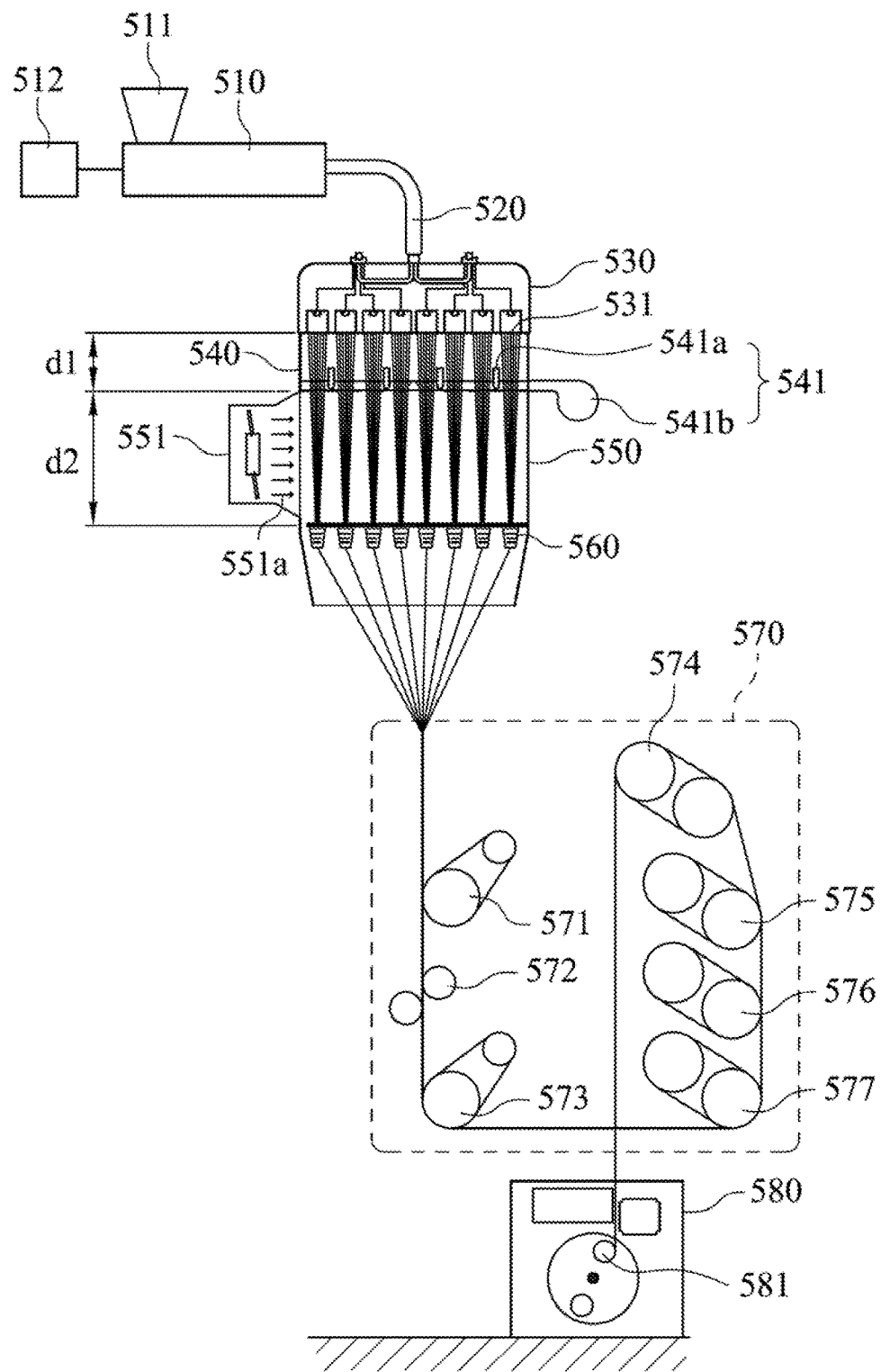
FIG. 5 is a schematic view showing an equipment for manufacturing a nylon 66 hollow fiber according to further another embodiment of the present disclosure.
Figure 6:
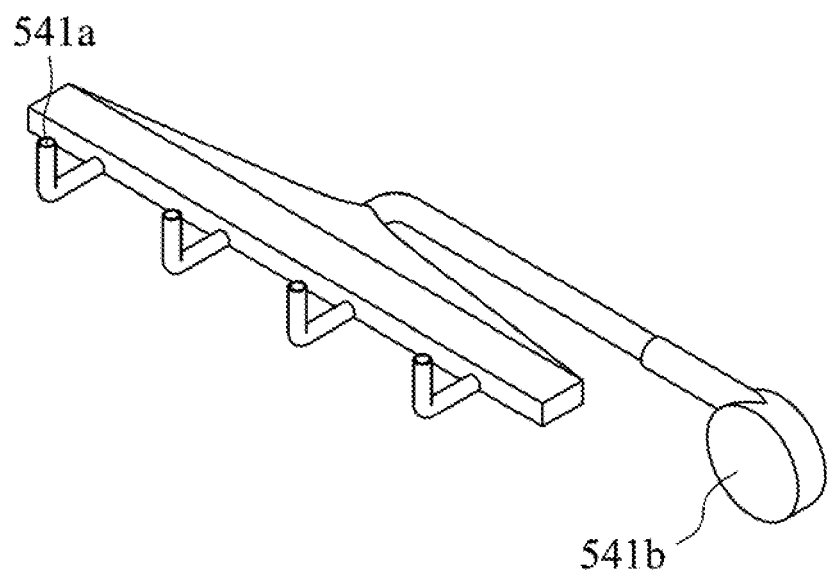
FIG. 6 is a three-dimensional thematic vie of an evacuating device in FIG. 5.

FIG. 5 is a schematic view showing an equipment for manufacturing the nylon 66 hollow fiber according to further another embodiment of the present disclosure, and the equipment can be used to implement the method shown in FIG. 1. In FIG. 5, the equipment for manufacturing the nylon 66 hollow fiber includes an extruder 510, a manifold 520, a spinning beam 530, an evacuating room 540, a cooling room 550, a collecting and oiling device 560, a drawing device 570 and a winding device 580. The extruder 510 includes a feeding tank 511 and a servo motor 512. The manifold 520 is communicated with the extruder 510. One end of the spinning beam 530 is communicated with the manifold 520, and the other end of the spinning beam 530 has a hollow spinneret plate 531. The evacuating room 540 is connected with the end of the spinning beam 530 having the hollow spinneret plate 531, and is further connected with an evacuating device 541. The evacuating room 540 is evacuated by the evacuating device 541. FIG. 6 is a three-dimensional schematic view of the evacuating device 541 in FIG. 5. The evacuating device 541 includes a plurality of exhaust pipes 541a and a pumping power source 541b. In the embodiment, the number of the exhaust pipes 541a is four, and the pumping power source 541b is a water aspirator. As shown in FIG. 5, nuzzles of the exhaust pipes 541a are disposed between different hollow spinneret plates 531, so that an excessive swell of the hollow nascent fibers can be prevented. Accordingly, the hollow ratio of the nylon 66 hollow fiber can be maintained. One end of the cooling room 550 is connected with the evacuating room 540, and the cooling room 550 is further connected with a cooling device 551. A cooling wind having a temperature ranging from 16° C. to 22° C. and a wind speed ranging from 0.55 m/s to 0.75 m/s is provided by the cooling device 551. In FIG. 5, the arrows 551a show the direction of the cooling wind. The collecting and oiling device 560 is disposed at the other end of the cooling room 550. The drawing device 570 is adjacent to the collecting and oiling device 560 (i.e., the drawing device 570 is adjacent to one end of the collecting and oiling device 560 which is far from the cooling room 550). In the embodiment, the drawing device 570 includes a first godet roller assembly 571, an oiling roller assembly 572, a second godet roller assembly 573, a third godet roller assembly 574, a fourth godet roller assembly 575, a fifth godet roller assembly 576 and a sixth godet roller assembly 577. The winding device 580 is adjacent to the drawing device 570 (i.e., the winding device 580 is adjacent to one end of the drawing device 570 which is far from the collecting and oiling device 560). The winding device 580 includes a cylindrical element 581. According to one embodiment of the present disclosure, a height d1 of the evacuating room 540 can be 15 cm to 30 cm, and a height d2 of the cooling room 550 can be 1.5 m to 2.1 m. Therefore, it is favorable for balancing the hollow ratio and the strength of the nylon 66 hollow fiber. According to one embodiment of the present disclosure, the second godet roller assembly 573, the third godet roller assembly 574, the fourth godet roller assembly 575, the fifth godet roller assembly 576 and the sixth godet roller assembly 577 can have heating function, and the bundled fiber can be heat set thereby. Therefore, the internal stress of the bundled fiber can be reduced, and the hollow ratio of the nylon 66 hollow fiber can be maintained.

When manufacture the nylon 66 hollow fiber, the nylon 66 particles are put into the feeding tank 511 and then into the extruder 510. The nylon 66 particles are melted in the extruder 510 so as to form the spun liquid. A temperature of the extruder 510 can be ranging from 290° C. to 295° C. Afterward, the screw (not shown) within the extruder 510 is driven by the servo motor 512 so as to extrude the spun liquid from the extruder 510 into the manifold 520. The temperature of the manifold 520 is controlled in the range of 290° C. to 295° C., so that the solidification of the spun liquid can be prevented before the spun liquid enters into the spinning beam 530. Then the spun liquid flows from the manifold 520 into the spinning beam 530 and goes through the hollow spinneret plate 531 so as to form a plurality of hollow nascent fibers. Meanwhile, the evacuating room 540 is evacuated by the evacuating device 541, so that a thermal energy of the hollow nascent fibers is taken away by the evacuating device 541, and the hollow nascent fibers are preliminarily solidified so as to form a plurality of hollow half-solidified fibers. The evacuating rate of the evacuating device 541 can be 5 m/s to 12 m/s. Afterward, the hollow half-solidified fibers are cooled and solidified by the cooling wind provided by the cooling device 551 so as to form a plurality of solidified fibers, and the solidified fibers are collected and oiled by the collecting and oiling device 560 so as to form a bundled fiber. The bundled fiber is drawn by the first godet roller assembly 571, the second godet roller assembly 573, the third godet roller assembly 574, the fourth godet roller assembly 575, the fifth godet roller assembly 576, and the sixth godet roller assembly 577 of the drawing device 570, and oiled by the oiling roller assembly 572 of the drawing device 570, so that a stretched fiber is formed. The rotational speed of the first godet roller assembly 571 can be 580 m/min to 780 m/min. The rotational speed of the second godet roller assembly 573 can be 615 m/min to 815 m/min, and the temperature of the second godet roller assembly 573 can be 55° C. to 65° C. The rotational speed of the third godet roller assembly 574 can be 1700 m/min to 2300 m/min, and the temperature of the third godet roller assembly 574 can be 130° C. to 150° C. The rotational speed of the fourth godet roller assembly 575 can be 2600 m/min to 3200 m/min, and the temperature of the fourth godet roller assembly 575 can be 200° C. to 220° C. The rotational speed of the fifth godet roller assembly 576 can be 2950 m/min to 3350 m/min, and the temperature of the fifth godet roller assembly 576 can be 210° C. to 230° C. The rotational speed of the sixth godet roller assembly 577 can be 2780 m/min to 3180 m/min, and the temperature of the sixth godet roller assembly 577 can be ranging from 170° C. to 190° C. Finally, the stretched fiber is wound around the cylindrical element 581 so as to obtain the nylon 66 hollow fiber. The rotational speed of the winding device 580 can be 2800 m/min to 3200 m/min.

Nylon 66 Hollow Fiber

A nylon 66 hollow fiber according to the present disclosure can be manufactured by the aforementioned method and equipment. A hollow ratio of the nylon 66 hollow fiber according to the present disclosure can be 8% to 12%. A hollow ratio of a conventional nylon 66 hollow fiber is about 1% to 3%. By using the method and equipment according to the present disclosure, the hollow ratio of the nylon 66 hollow fiber can be increased significantly. Furthermore, a strength of the nylon 66 hollow fiber according to the present disclosure can be 7.0 g/d to 9.0 g/d, and an elongation of the nylon 66 hollow fiber according to the present disclosure can be 20% to 26%, which shows that the nylon 66 hollow fiber according to the present disclosure can maintain the physical properties, such as strength and elongation while having a high hollow ratio.

Examples and Comparative Examples

Example 1 the commercially available nylon 66 particles are dealt with a viscosity adjusting step. Specifically, the nylon 66 particles are put into a drying container, wherein nitrogen gas with a temperature of 175° C. is introduced into the drying container at a speed of 800 Nm³/hr. The dew point in the drying container is −20° C. A solid state polymerization of the nylon 66 particles is conducted. The time of the solid state polymerization is 24 hours, so that a relative viscosity in sulfuric acid of the nylon 66 particles is in a range of 3.2 to 3.4. Then a moisture adjusting step is provided. The nylon 66 particles dealt with the viscosity adjusting step (i.e., the solid state polymerization) are dried at 90° C. to 100° C. under nitrogen atmosphere till the moisture content of the nylon 66 particles is in the range of 500 ppm to 2000 ppm. The nylon 66 particles dealt with the viscosity adjusting step and the moisture adjusting step are used to produce the nylon 66 hollow fiber by the equipment in FIG. 5. The temperature of the extruder 510 is set at 290° C. to 295° C., the temperature of the manifold 520 and the spinning beam 530 are set at 290° C. to 295° C., the evacuating rate of the evacuating device 541 is set at 5 m/s to 12 m/s, a cooling wind having a temperature of 18° C. and a wind speed of 0.55 m/s is provided by the cooling device 551, the rotational speed of the first godet roller assembly 571 is 680 m/min, the rotational speed of the second godet roller assembly 573 is 715 m/min and the temperature thereof is 60° C., the rotational speed of the third godet roller assembly 574 is 2000 m/min and the temperature thereof is 140° C. the rotational speed of the fourth godet roller assembly 575 is 2900 m/min and the temperature thereof is 210° C., the rotational speed of the fifth godet roller assembly 576 is 3150 m/min and the temperature thereof is 220° C., the rotational speed of the sixth godet roller assembly 577 is 2980 m/min and the temperature thereof is 180° C., the rotational speed of the winding device 580 is 3000 m/min, whereby a 235/72 nylon 66 hollow fiber is obtained. The conditions of Example 1 are listed in Table 1. In the aforementioned "235/72", "235" is the denier of a nylon 66 solid fiber, which has a same diameter with the nylon 66 hollow fiber. Therefore, the actual denier of the nylon 66 hollow fiber is smaller than 235. The actual denier of the nylon 66 hollow fiber s listed in Table 2.

Comparative Example 1 the hollow spinneret plate 531 in Example 1 is replaced by a circular spinneret plate (both the shape and the number of the spinnerets of the circular spinneret plate are different from that of the hollow spinneret plate 531). When the spun liquid goes through the circular spinneret plate, a plurality of solid nascent fibers with circular cross section can be formed, and the final product of Comparative Example 1 is a nylon 66 solid fiber with circular cross section. Furthermore, the evacuating step and the oiling sub-step are omitted in Comparative Example 1. That is, the evacuating room 540 is not evacuated by the evacuating device 541, and the bundled fiber is not oiled by the oiling roller assembly 572. The other steps and conditions of Comparative Example 1 are the same as that of Example 1, and are listed in Table 1, whereby a 235/68 nylon 66 solid fiber is obtained.

Comparative Example 2

Comparing to Example 1, the evacuating step and the oiling sub-step are omitted in Comparative Example 1. That is, the evacuating room 540 is not evacuated by the evacuating device 541, and the bundled fiber is not oiled by the oiling roller assembly 572. The other steps and conditions of Comparative Example 2 are the same as that of Example 1, and are listed in Table 1, whereby a 235/72 nylon 66 hollow fiber is obtained.

TABLE 1

|  | Example 1 | Comparative Example 1 | Comparative Example 2 |
|---|---|---|---|
| Specification cross section | 235/72 hollow | 235/68 circular | 235/72 hollow |
| evacuated by the evacuating device 541 | Yes | No | No |
| wind speed/temperature of the cooling wind [(m/s)/° C.] | 0.55/18 | 0.55/18 | 0.55/18 |
| oiled by the oiling device 560 | Yes | Yes | Yes |
| rotational speed of the first godet roller assembly 571 (m/min) | 680 | 680 | 680 |
| oiled by the oiling roller assembly 572. | Yes | No | No |
| rotational speed/temperature of the second godet roller assembly 573 [(m/min)/° C.] | 715/60 | 715/60 | 715/60 |
| rotational speed/temperature of the third godet roller assembly 574 [(m/min)/° C.] | 2000/140 | 2000/140 | 2000/140 |
| rotational speed/temperature of the fourth godet roller assembly 575 [(m/min)/° C.)] | 2900/210 | 2900/210 | 2900/210 |
| rotational speed/temperature of the fifth godet roller assembly 576 [(m/min)/° C.)] | 3150/220 | 3150/220 | 3150/220 |
| rotational speed/temperature of the sixth godet roller assembly 577 [(m/min)/° C.)] | 2980/180 | 2980/180 | 2980/180 |
| rotational speed of the winding device 580 (m/min) | 3000 | 3000 | 3000 |

The actual denier, strength, elongation and hollow ratio of the nylon 66 hollow fiber of Example 1 and Comparative Example 2 and the nylon 66 solid fiber of Comparative Example 1 are measured, wherein the measurement of the actual denier is according to ASTM D1907-2010, the measurement of the strength is according to ASTM 2256, the measurement of the elongation is according to ASTM 2256, and the measurement of the hollow ratio is as follows. First, the scanning electron microscope (SEM) photographs of the nylon 66 hollow fiber of Example 1 and comparative Example 2 are captured. Second, the inner diameter and the outer diameter of the nylon 66 hollow fiber of Example 1 and comparative Example 2 shown in the SEM photographs are measured. The hollow ratio is calculated from the following formula: the hollow ratio (%)=(inner diameter/outer diameter)*100%. The measuring result of the actual denier, the strength, the elongation and the hollow ratio of the nylon 66 hollow fiber of Example 1 and Comparative Example 2 and the nylon 66 solid fiber of Comparative Example 1 are listed in Table 2.

TABLE 2

|  | Example 1 | Comparative Example 1 | Comparative Example 2 |
|---|---|---|---|
| actual denier (Denier) | 210 | 235 | 210 |
| strength (g/d) | 8.4 | 8.3 | 8.25 |
| elongation (%) | 24.5 | 25.5 | 25 |
| hollow ratio (%) | 8-12 | N/A | 1-3 |

As shown in Table 2, the hollow ratio of Example 1 is much greater than that of Comparative Example 2. It is apparent that the method and equipment for manufacturing the nylon 66 hollow fiber according to the present disclosure can effectively enhance the hollow ratio of the nylon 66 hollow fiber. Furthermore, the strength of Example 1 is better than that of Comparative Example 1, and the elongation of Example 1 is comparable to that of Comparative Example 1, which shows the nylon 66 hollow fiber according to the present disclosure can have a higher hollow ratio while maintaining the physical properties, such as strength and elongation, which are comparable to that of a nylon 66 solid fiber.

Example 2 the nylon 66 hollow fiber of Example 1 is further processed so as to form a 450/144 air-textured yarn (ATY), and the air-textured yarn is woven so as to form a woven fabric, the warp density×weft density of the woven fabric is 49×35. The unit of the warp density and the unit of the weft density are (number of the ATY)/inch.

Comparative Example 3 the nylon 66 solid fiber of Comparative Example 1 is further processed so as to form a 500/136 air-textured yarn, and the air-textured yarn is woven so as to form a woven fabric, the warp density×weft density of the woven fabric is 49×35. The unit of the warp density and the unit of the weft density are (number of the ATY)/inch.

The taber abrasion, tearing strength and tensile strength of the woven fabric of Example 2 and Comparative Example 3 are measured, wherein the measurement of the taber abrasion is according to ASTMD-3884 (2000 cycle), the measurement of the tearing strength is according to ISO 13937-2, the measurement of the tensile strength is according to ISO 13934-1, and the measuring results are listed in Table 3.

TABLE 3

|  |  | Example 2 | Comparative Example 3 |
|---|---|---|---|
| taber abrasion | Weight of a yard of the woven fabric before abrasion (GSM) | 6.7515 | 6.7707 |
|  | Weight of a yard of the woven fabric after abrasion (GSM) | 6.5638 | 6.5611 |
|  | Weight loss (%) | 2.78 | 3.1 |
| tearing strength (N) |  | 111.08 | 101.0 |
| tensile strength (N) |  | 1289 | 1335 |

The woven fabric of Example 2 is woven by ATY made of the nylon 66 hollow fiber, and the woven fabric of Comparative Example 3 is woven by ATY made of the nylon 66 solid fiber. The Denier of the ATY of Example 2 is smaller than that of Comparative Example 3. However, as shown in Table 3, the taber abrasion and the tearing strength of the woven fabric of Example 2 are better than that of Comparative Example 3, and the tensile strength of the woven fabric of Example 2 is only slightly inferior to that of Comparative Example 3. It is apparent that the woven fabric made of the nylon 66 hollow fiber according to the present disclosure can satisfy lightweight requirement while maintaining the tearing strength and the tensile strength and having an excellent taber abrasion.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for manufacturing a nylon 66 hollow fiber, comprising:
   providing a plurality of nylon 66 particles;
   providing a melting step, wherein the nylon 66 particles are melted so as to form a spun liquid;
   providing a fiber spitting step, wherein the spun liquid goes through a hollow spinneret plate so as to form a plurality of hollow nascent fibers;
   providing an evacuating step, wherein a thermal energy of the hollow nascent fibers is taken away by evacuating, and the hollow nascent fibers are preliminarily solidified so as to form a plurality of hollow half-solidified fibers;
   providing a cooling step, wherein a cooling wind with a temperature ranging from 16° C. to 22° C. is provided for cooling and solidifying the hollow half-solidified fibers so as to form a plurality of solidified fibers;
   providing a collecting and oiling step, wherein the solidified fibers are collected and oiled so as to form a bundled fiber;
   providing a drawing step, wherein the bundled fiber is drawn so as to form a stretched fiber, and the drawing step comprises a plurality of drawing sub-steps and an oiling sub-step, the oiling sub-step is conducted between two of the drawing sub-steps, and the bundled fiber is oiled by an oiling roller assembly; and
   providing a winding step, wherein the stretched fiber is wound around a cylindrical element so as to obtain the nylon 66 hollow fiber.

2. The method for manufacturing the nylon 66 hollow fiber of claim 1, wherein the drawing step comprises a first drawing sub-step, a second drawing sub-step, a third drawing sub-step, a fourth drawing sub-step, a fifth drawing sub-step and a sixth drawing sub-step, and the oiling sub-step is conducted between the first drawing sub-step and the second drawing sub-step.

3. The method for manufacturing the nylon 66 hollow fiber of claim 1, further comprising:
   providing a viscosity adjusting step, wherein a relative viscosity in sulfuric acid of the nylon 66 particles is adjusted to a range of 3.2 to 3.4.

4. The method for manufacturing the nylon 66 hollow fiber of claim 1, further comprising:
   providing a moisture adjusting step, wherein a moisture content of the nylon 66 particles is adjusted to a range of 500 ppm to 2000 ppm.

* * * * *